United States Patent [19]
Glawion et al.

[11] Patent Number: 6,062,838
[45] Date of Patent: May 16, 2000

[54] MELT SPINNING APPARATUS

[75] Inventors: Erwin Glawion, Grossostheim; Willi Kretzschmar, Neumunster, both of Germany

[73] Assignee: Rieter-Automatik GmbH, Grossostheim, Germany

[21] Appl. No.: 09/073,979

[22] Filed: May 7, 1998

Related U.S. Application Data

[63] Continuation of application No. 08/758,641, Nov. 27, 1996, abandoned.

[30] Foreign Application Priority Data

Nov. 30, 1995 [DE] Germany .......................... 195 44 662

[51] Int. Cl.$^7$ .................................................. D01D 5/088
[52] U.S. Cl. .................. 425/72.2; 425/378.2; 425/382.2; 425/464
[58] Field of Search .............................. 425/72.2, 378.2, 425/382.2, 464

[56] References Cited

U.S. PATENT DOCUMENTS

| | | |
|---|---|---|
| 3,562,858 | 2/1971 | Lehner . |
| 3,583,027 | 6/1971 | Garrett et al. . |
| 3,584,678 | 6/1971 | Rakestraw . |
| 3,593,775 | 7/1971 | Privott, Jr. . |
| 3,650,716 | 3/1972 | Brossard . |
| 4,173,443 | 11/1979 | Lin . |
| 4,259,048 | 3/1981 | Miani . |
| 4,643,750 | 2/1987 | Glaser . |
| 4,820,142 | 4/1989 | Balk . |
| 4,988,270 | 1/1991 | Stibal et al. . |
| 5,098,636 | 3/1992 | Balk . |
| 5,178,814 | 1/1993 | Lemond . |
| 5,230,905 | 7/1993 | Fare et al. . |
| 5,292,239 | 3/1994 | Zeldin et al. . |
| 5,487,655 | 1/1996 | Frey et al. ........................ 425/72.2 |
| 5,536,157 | 7/1996 | Linz ................................ 425/72.2 |
| 5,700,491 | 12/1997 | Herwegh et al. ................. 425/72.2 |

FOREIGN PATENT DOCUMENTS

| | | |
|---|---|---|
| 0536497A2 | 4/1993 | European Pat. Off. . |
| 1087751 | 8/1960 | Germany . |
| 9210599 | 6/1992 | Germany . |
| 9504173 | 2/1995 | WIPO . |

OTHER PUBLICATIONS

Patent Abstracts of Japan No. 5706612, Published Apr. 22, 1982.

*Primary Examiner*—Harold Pyon
*Assistant Examiner*—Joseph Leyson
*Attorney, Agent, or Firm*—Dority & Manning

[57] ABSTRACT

In a melt spinning apparatus, cooling system with a blower nozzle with slit-shaped outlet openings is used which is directed upon the yarns emerging from the spinning nozzle. The blower nozzle is provided with a bend immediately before its outlet opening through which the air stream is directed to the output of the yarns from the spinning nozzles. The bend is designed so that a rapid and effective cooling of all the extruded filaments takes place, even with a nozzle package with a large number of perforations, without having to provide several blower nozzles. A narrowing at a given distance before the outlet opening ensures even distribution of the flow profile produced over the entire outlet cross-section of the blower nozzle. Furthermore, the spinning nozzles are assigned an induction heating system in which induction coils are placed above the area over which the spinning nozzles extend.

22 Claims, 8 Drawing Sheets

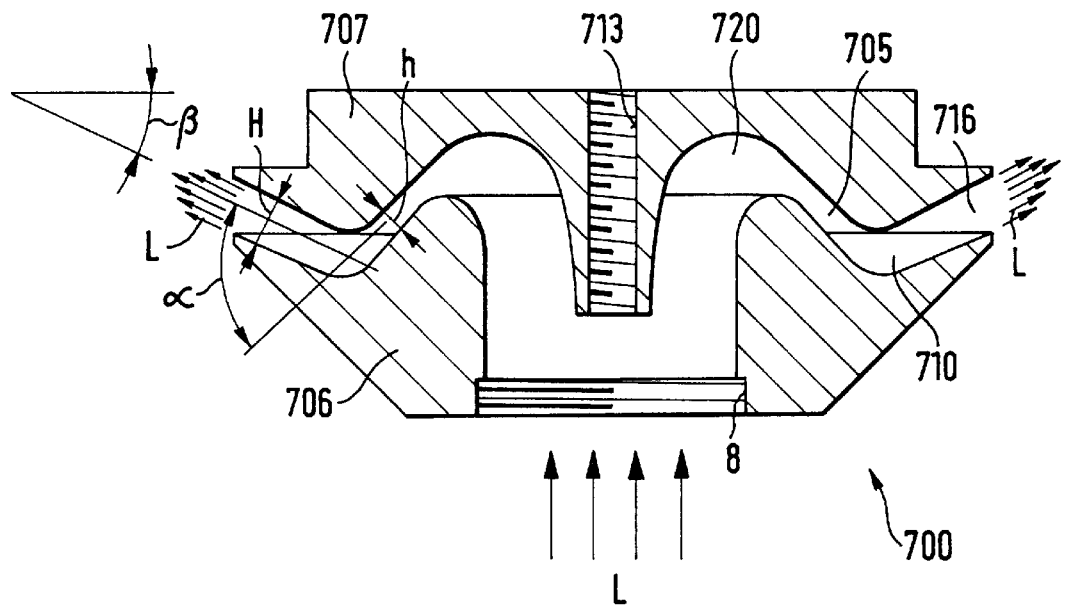
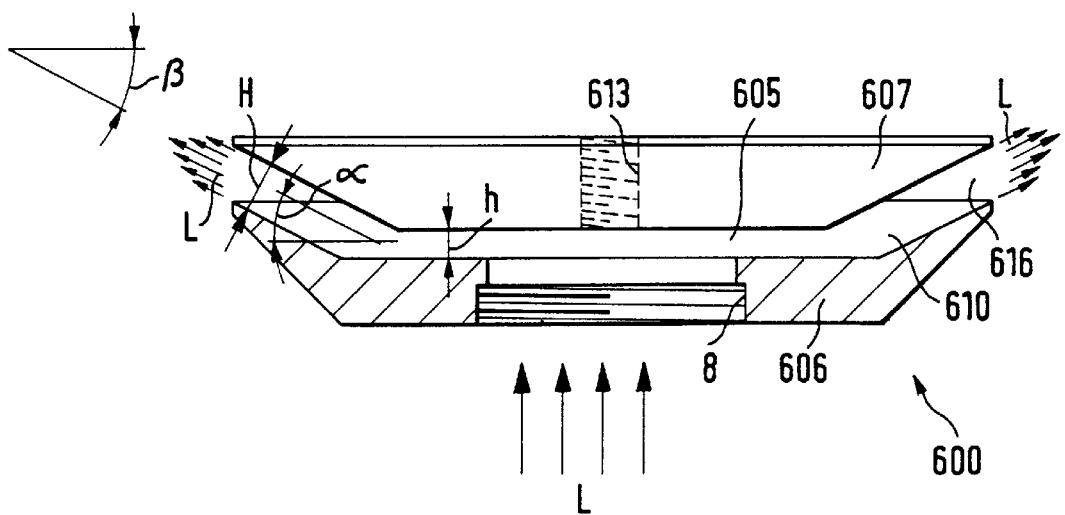

MELT SPINNING APPARATUS

This is a Continuation application of Ser. No. 08/758,641, filed Nov. 27, 1996, now abandoned.

BACKGROUND OF THE INVENTION

The present invention relates to an apparatus for the extrusion of a molten polymer material into a plurality of yarns, whereby this apparatus is provided with distribution channels through which the molten mass is fed to spinning nozzles, as well as with heating devices in order to keep the material flow at the required temperature for extrusion until emergence from the nozzle bores, and furthermore with a cooling system with a blower nozzle associated with the nozzle bores having a slit-shaped outlet opening which is directed upon the yarns emerging form the nozzle bores so that the latter are subjected to the air flow coming out of the blower nozzle.

Filaments of yarn-forming polymers such as polyester, polyamide and polyolefine are normally produced in the melt-spinning process. In this process, the polymer is melted down and homogenized in an extruder and is then fed through a melt line to spinning pumps which press the molten mass through nozzle bores. The filaments emerging from the spinning nozzles are continuously cooled by an air stream. The filaments thus produced are then prepared, gathered together into a cable, drafted, crimped and cut into staple fibers.

The first steps of the process have a great influence on the subsequent process steps with regard to product quality, so that even before or during the yarn formation the final quality of the yarns or staple fibers is decidedly determined.

The process starts with the extrusion, which must deliver as homogenous a molten mass as possible with respect to temperature distribution, and if applicable, also distribution of additives.

The distribution of the molten mass among the nozzle bores takes place therefore in precisely stepped channel system with as identical channel lengths as possible for all spinning pumps. Constant temperature is ensured by means of heating of all channel segments in as uniform a manner as possible. Gear pumps with frequency-regulated drives provide precise dosage of the individual volume flows to the nozzle bores.

In practice, different shapes of the spinning nozzle packages, i.e. rectangular, annular and round-nozzle packages are used, depending on the application, and for these as uniform a distribution of the molten mass must ben ensured in turn over the entire output surface of the molten mass.

A distribution system of this type for a ring-nozzle package is shown for example in EP 0 517 994, where the molten mass is conveyed through a complicated system of channels of equal length to the nozzle bores of a ring-shaped nozzle package. In U.S. Pat. No. 4,259,048 an annular nozzle package is described in which the distribution of the molten mass is ensured by a plate-shaped space.

However, these solutions function faultlessly only if all the channels are at the same temperature, as otherwise differences in the flow capability of the polymer appear due to the temperature difference, and the molten mass flows preferably through the warmer channels according to the principle of least resistance. This expresses itself clearly in the difference in titer and is expressed in the end product through the variation coefficient. Furthermore, such temperature irregularities have a detrimental influence upon draftability, so that high product quality cannot readily be achieved. This applies in particular to the production of very think fibers or filaments, since the inherent enthalpy is lower, due to the lower throughput, and therefore the influence of temperature on the viscosity of the molten mass is greater because of the longer dwell time.

In practice it has been found however, that even in a housing heated with a vaporous heat-carrying oil with seats for the spinning nozzles, the so-called spinning beam, temperature differences occur because the nozzles cannot be installed without gaps. Gaps serve to compensate for deformation processes when seals are crushed, or are required as safety clearances because of the heat expansion occurring at the process temperatures between 220 and 300° C. Because of these gaps, the optimal heat transfer through heat conduction can be used only to a very limited extent.

The utilization of electrical heating elements (DE 4 312 309 C2) which can be screwed or clamped directly on the spinning nozzle package, offers a solution. This means however, that the energy required for heating must be supplied through wires and contacts which must be removed when a spinning nozzle package or even parts of same must be disassembled, and this considerably increases the cost and also leads to increased wear of the parts involved. Furthermore, energy losses occur in the wires and contact bridges. Another aspect here is the danger to machine operators due to electrical voltage which appears on these heating elements and may endanger personnel in case of improper handling.

The direct thermal oil heating system also represents a considerable complication in installation and removal of the spinning nozzles or of the nozzle package, since oil pollution can be expected during the establishment or the removal of the connections. Furthermore these residues interfere with the cleaning of nozzle bores in cleaning devices. Local temperature adaptation in case of interfering influences is not possible.

The uniformity of yarn cooling at emergence from the spinning nozzle package has as much importance as even distribution of the molten mass. Here it must be ensured that each filament is cooled with the most uniform air temperature possible on the same path and at the most uniform speed possible. Cooling at the congealing point of the molten mass is of the greatest importance here, since the momentary position of the still freely moving and already pre-oriented molecules of the synthetic material is frozen. Differences in cooling result as a rule in differences in draftability and, in the worst case, to yarn breakage already in spinning. To reduce these influences, lateral blowing, inflow cooling (from the outside to the inside) and outflow cooling (from the inside to the outside) is applied, depending on the nozzle shape used. Depending on the density of the field of perforation, on the width of the field of perforation, on polymer and throughput, the air velocity varies between 0.1 and over 20 m/s.

All cooling processes and air velocities have the common problem that the blown air heats up as it penetrates the filament group from filament to filament and has therefore a distinctly higher temperature at its output than on the input side. Consequently, the filaments on the output side receive different cooling from the filaments on the input side of the cooling air. As described earlier, this leads to differences in draftability and to reduced product quality. In addition, the movement of the filaments and the resulting drag flow cause a certain amount of deflection of a previously well directed air stream, so that the uniformity of the congealing point between input and output side is also no longer ensured.

EP 0 536 497 therefore describes a cooling system with outflow blowers which consist of two units with different orientation and with substantially independent adjustability with respect to blown air flow to reduce the temperature differences or to compensate for the blown air deflection. This blown air stream is expensive and yet not satisfactory.

OBJECTS AND SUMMARY OF THE INVENTION

It is a principal object of the present invention to improve the conditions for the extrusion of the yarn-forming polymer materials and thereby the quality of the final product. Additional objects and advantages of the invention will be set forth in part in the following description, or may be obvious from the invention, or may be learned through practice of the invention.

The objects are attained by the device according to the invention. The blow nozzle according to the invention makes it possible to achieve rapid and effective cooling of all extruded filaments in a uniform manner, also with nozzle packages with a large number of perforations. Without having to provide several blowing nozzles, which would furthermore have to be adjustable independently of each other for the correct cooling air amount and velocity, the correct distribution of quantities and velocity through the configuration of the blower nozzle is achieved according to the invention. The surprisingly strong effect of this blower nozzle according to the invention is obviously due to the fact that due to the velocity distribution and the considerably higher velocities on the side of the blower nozzle away from the spinning nozzle package, an injector effect is produced which causes suction of air away from the area below as well as from outside the filament group. This creates a circulation within the filament group, with the air sucked from the outside through the filament group acting as a reinforcement of the blown air stream emerging from the blower nozzle. Due to the fact that the circulatory movement causes fresh air to be aspired from the outside to the inside, cool air first reaches the outer filament flows and thereby leads to a further reduction of the cooling differences between the filament rows on the input side of blown air and those on the output side of blown air. To increase the cooling capacity, spraying of water or a spinning solution into the flow of blown air is advantageous. The evaporation of the fluid atomized into aerosols causes large amounts of heat to be withdrawn from the molten and flowing filaments and causes a significant reduction of the cooling length until the molten mass congeals. Since the cooling capacity represents a limitation of throughput, in particular in the production of thick filaments, the productivity of the spinning apparatus is thereby increased considerably. The upstream bend in opposite direction to the bend at the nozzle output makes it possible to feed cooling air also from below.

It has been shown that the uniformity of the air velocity over the circumference of the blowing nozzle plays also a decisive role in the reliable running of the filament production. In spite of the most precise adjustment of the gap of the blower nozzle over the entire circumference, defects in running reliability of filament production do occur. Due to the fact that a narrowing precedes the outlet opening, in particular the bend, through which the air stream is compressed and flattened, the air velocity is substantially evened out over the entire output area of the nozzle.

It has been shown that by using an induction heating system, a heat source is made available which causes heat to be produced where it is needed, i.e. in the nozzle package. In order to even out the heating, a short-circuit ring can additionally be provided, in which current begins to flow through induction and heats up said short-circuit ring. The heat is thus brought on the shortest way to the critical locations of the nozzle package, the distribution channels as well as the nozzle plate with the field of perforations, without cable and contact connections, or it is produced directly there, so that losses are avoided. When replacing the nozzle package or parts thereof, only the mechanical attachment of the nozzle package must be opened. The induction heating system can remain as is in its place.

Additional details of the invention are described through the drawings.

BRIEF DESCRIPTION OF THE DRAWINGS

FIGS. 12/13 show to additional embodiments of the design of the blower nozzle according to the invention.

DETAILED DESCRIPTION OF THE PREFERRED EMBODIMENT

Figure 1:
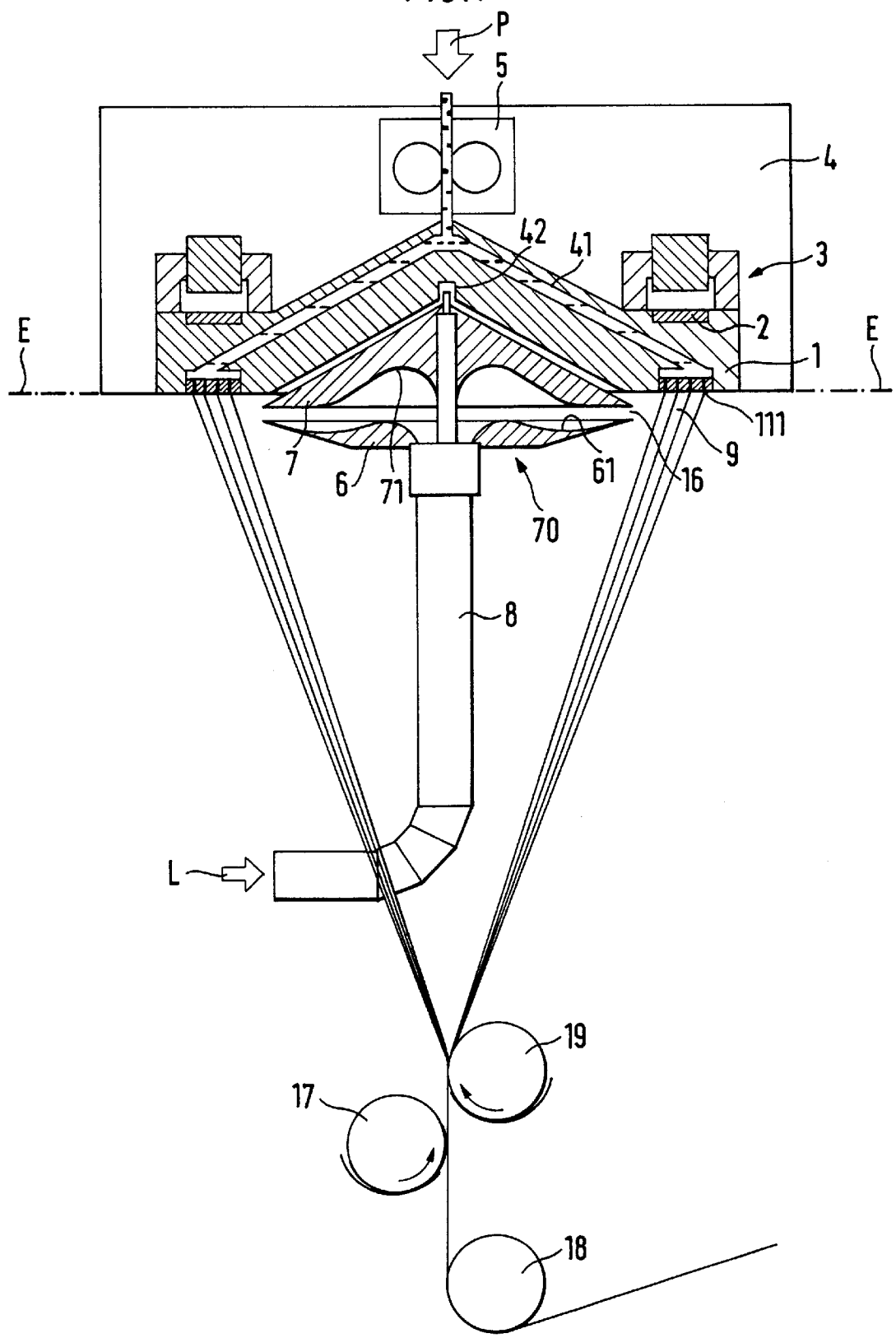
FIG. 1 shows a schematic overall view of the apparatus according to the invention.
Figure 2:
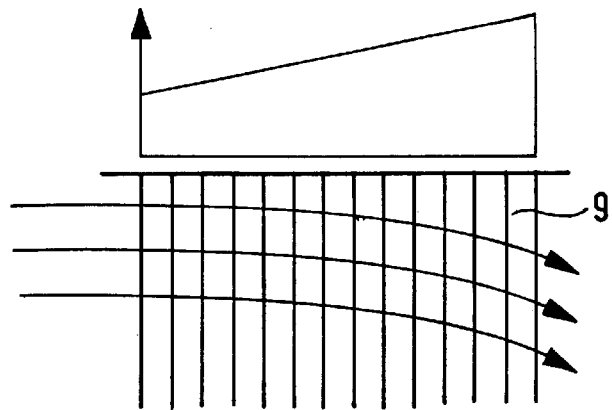
FIG. 2 shows the temperature increase when the air flows through the filament group according to the state of the art.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present invention cover such modifications and variations.

FIG. 1 shows an annular spinning nozzle package 1 which is built into a housing 4 and contains nozzle bores 111. Out of the nozzle bores 111, correspondingly circular filaments 9 emerge and are drawn off via draw-off roller 18. The filaments 9 are bundled by two preparation rollers 17 and 19 facing each other which are applying at the same time the preparation liquid needed for further processing. Blown air L is directed via a pipe 8 which is concentric with the spinning nozzle package 1 to a blower nozzle 70 which consists essentially of a lower part 6 and an upper part 7. The blown air emerges radially to the outside from the outlet opening 16 and flows through the filaments 9 from the inside out, immediately following their emergence from the nozzle bores 111. The outlet opening 16 of the blower nozzle 70 is annular in form to correspond to the circular arrangement of the nozzle bores 111 and is concentric with the spinning nozzle package 1.

The molten mass P is fed to the spinning nozzle package 1 by a spinning pump 5 which feeds the molten mass P via distribution channels 41 to the spinning nozzle package 1 and distributes them evenly. The uniformity of temperature which is necessary for a good distribution of the molten mass is ensured by means of an induction heating system with induction coils 3 with U-shaped iron core 32 and with a short circuit ring 2. The short circuit ring 2 is imbedded in a recess 21 (FIG. 7) in the spinning nozzle package 1 and is directly connected to the spinning nozzle package 1 through screwing or in a similar manner, so that the heat produced in the short circuit ring is transferred directly to the spinning nozzle package 1. The induction coils 3 are distributed evenly over the circumference of the short circuit ring . The U-shaped iron core 32 installed in the spinning nozzle package 1 in the recess 21 causes magnetic field lines M to be produced which flow through the ferromagnetic material of the spinning nozzle package 1 in radial direction (FIG. 7) when current flows through.

The spinning nozzle package 1, as well as the induction coils 3, are located in a housing 4 of the spinning apparatus, so that the spinning nozzle package 1 can be installed independently without affecting the induction coils 3.

The air supply from below which is required because a central distribution of the molten mass is used is directed by a special blower nozzle 70 upon the filaments 9 emerging from the nozzle bores 111.

Figure 3:
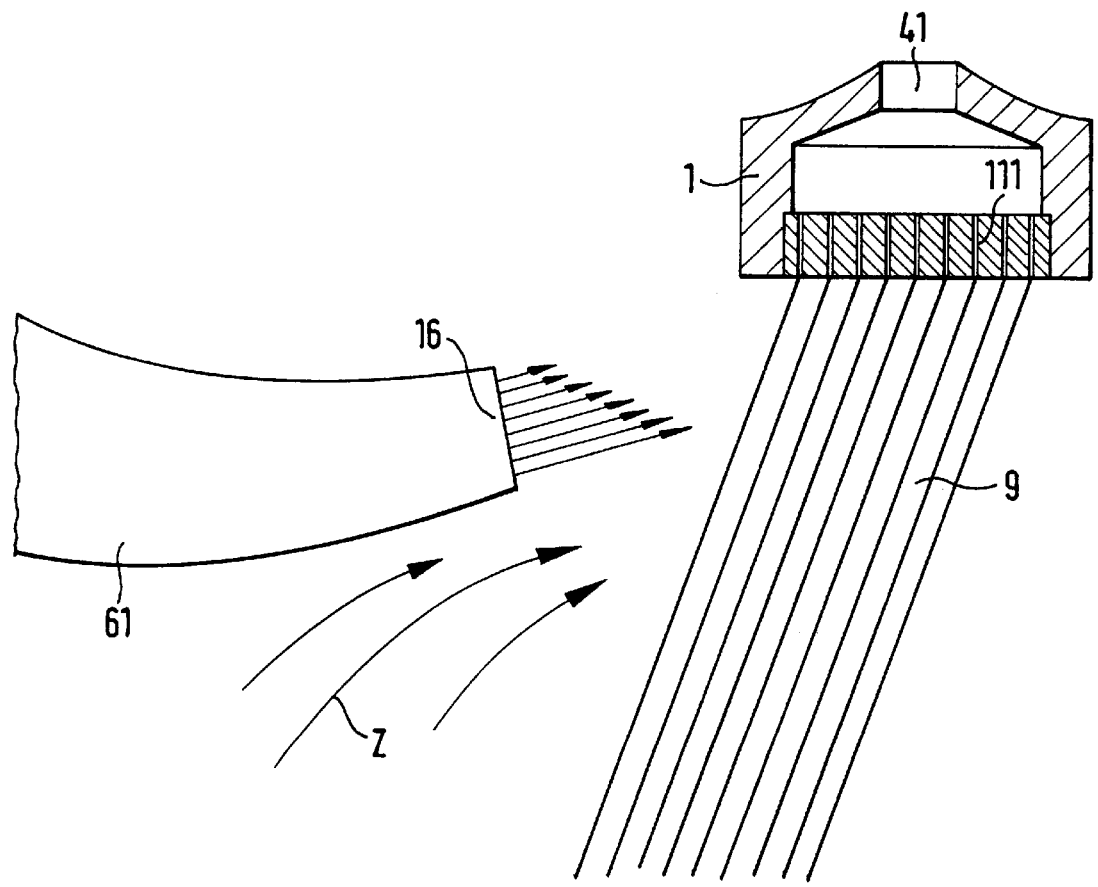
FIG. 3 shows the distribution of flow velocity at the outlet of the blower nozzle.
Figure 4:
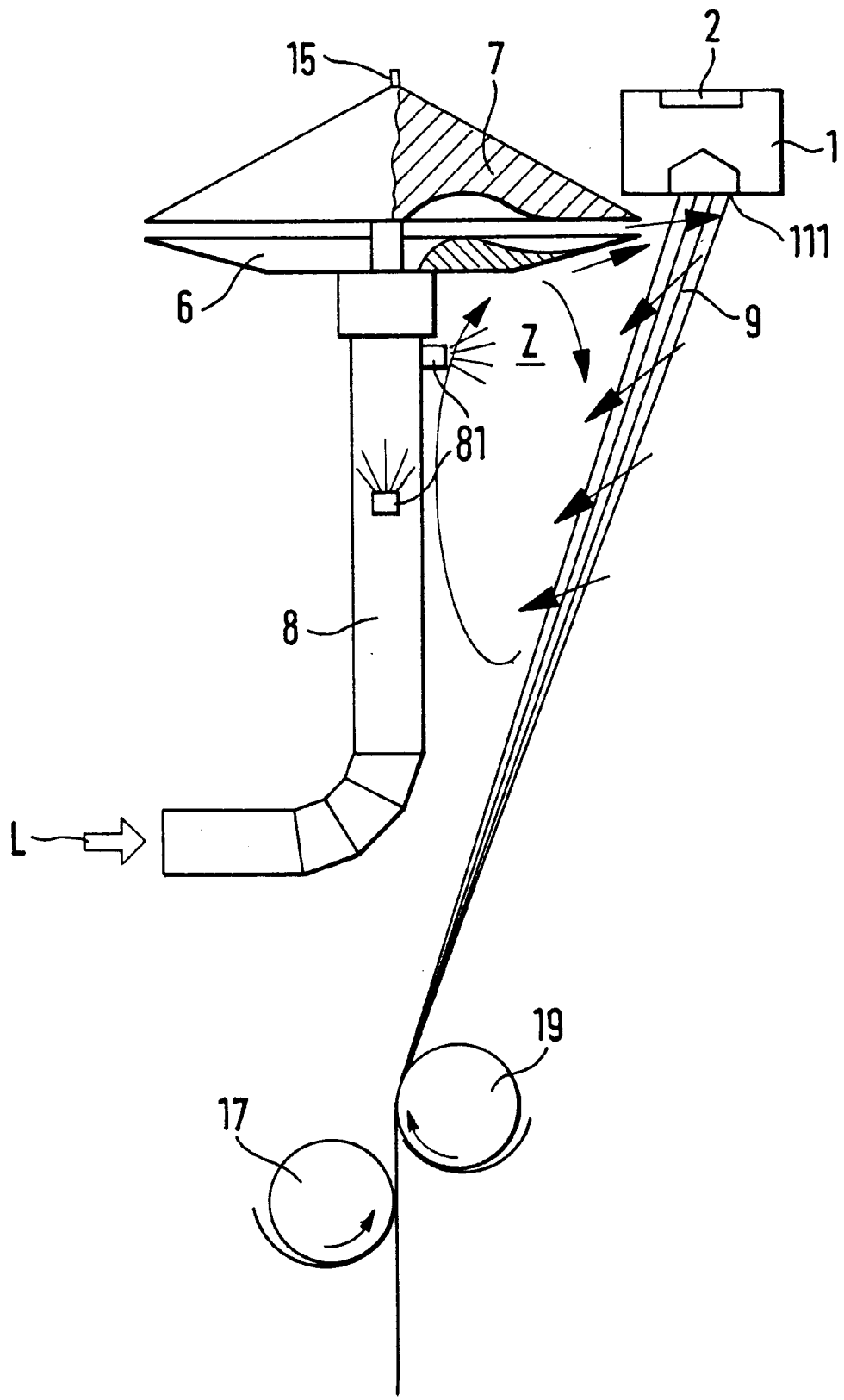
FIG. 4 shows the circulation flow in combination with the blower nozzle.
Figure 5:
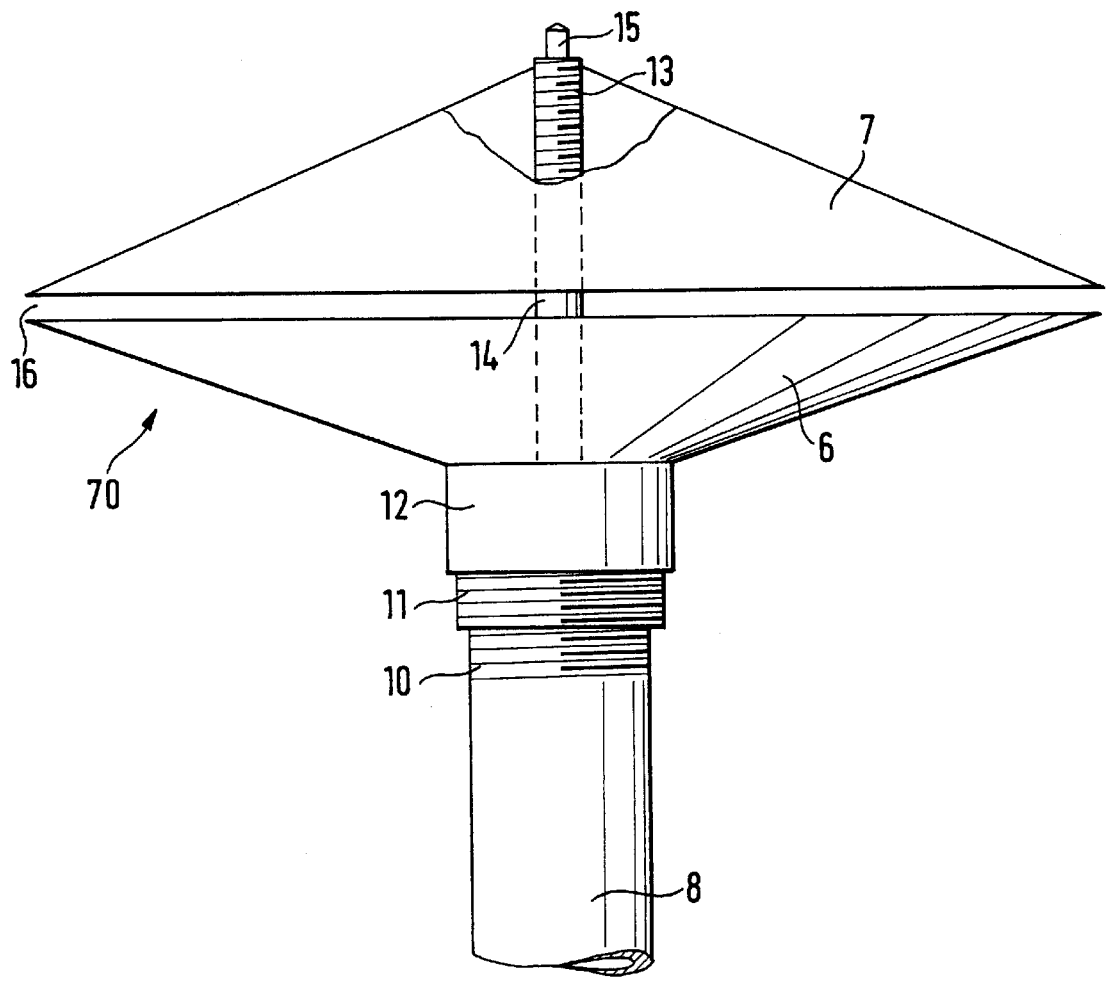
FIG. 5 shows the adjusting device of the blower nozzle.

As can be seen in FIGS. 3–5, the blower nozzle 70 is designed in a special manner to guide the blown air stream L. The upper part 7 and the lower part 6 together constitute a guide for the air, whereby the air guide in the lower part 6 is provided with a bend 61 shortly before the height adjustment threads 10 through which the air stream is deflected to the output of the filaments 9 from the nozzle bores 111. The crest of the bend 61 is therefore on the side away from the nozzle bores 111. As the air flows through this bend 61 it is compacted at the outside of the bend 61 and as a result is given greater velocity at that point. This velocity profile is shown schematically in FIG. 3. Depending on the configuration of the arc of this bend 61, it serves to obtain a velocity profile that is advantageous for the flow through the filament bundle.

In tests it has now been shown that the following applies basically: The sharper the deflection through bend 61 before the outlet opening 16 of the narrowing, the more distinct is the velocity profile. However this also increases the turbulence of the flow. It was furthermore found that as the bend angle α increases, the height of the blower nozzle 70 also increases, and this is not desirable, so that the bend angle α should practically not be greater than 90°. Within this range, the constructive height of the blower nozzle 70 remains suitable, and a good and distinct flow profile without great turbulence is thus produced nevertheless.

Since the length of the segment after the bend 61 can reduce turbulence but since the velocity profile produced by the deflection is then again rendered more uniform, a length equal to preferably twice to four times the height H of the cross-section of the outlet opening 16 has proven to be optimal.

Measurements have shown that the production of such a flow velocity profile of the blower nozzle 70 produces a circulatory flow Z which assists and reinforces the cooling air stream of the blower nozzle 70 in a most advantageous fashion. In FIGS. 3–4 it can be seen that the air stream emerging from the outlet opening 16 exerts an injector action and sucks air from the area below the blower nozzle 70. This goes so far that air follows even from the area outside the filament bundle 9 and then exerts a cooling action upon the outer filaments 9 before being used up. However an air circulation Z also takes place inside the filament bundle 9 due to the downward movement of the filaments. This apparently explains the great effectiveness of the blower nozzle 70 made according to the invention.

The cooling action of the blown air L can of course also be reinforced by injecting water or a spinning preparation. For this purpose, spray nozzles 81 can be provided either inside the blown air channel 8 and/or in star form around this blown air channel 8 (FIG. 4). Here too the air circulation described above has a favorable effect.

In the described embodiment (FIGS. 1–4), the blown air stream L is directed from below through the blown air channel 8 to the blower nozzle 70. Since the blown air must blow from the inside out through the filament bundle 9, a deflection of the air stream by about 90° is necessary. Such a deflection would however produce an undesirable flow profile. For this reason the bend 61 is preceded by a second bend 71, whereby its crest is located in the upper part 7 of the blower nozzle 70. This upper part 7 extends in the form of a roof upward or, if the blower head is round, it is conical, so that sufficient space is provided for the bend 71. These two bends 71 and 61 installed one after the other cause the air, which rises vertically, to be first deflected downward, to be then directed in such manner by the bend 61 with the desired velocity profile at the outlet 16 that the blown air stream seizes the filaments 9 emerging from the nozzle bores 111 immediately over the entire width of the spinning nozzle package 1. The air flow emerging at the lower edge of the bend 61 reaches the filament bundle 9 at a greater velocity here, and at a greater distance from the nozzle output, than the airstream arriving with slower speed at the inner wall of the bend 61 formed by the upper part 7, which reaches the yarn bundle 9 immediately upon emergence from the nozzle bores 111 on the input side, while the filament bundle 9 is subjected on the output side to the greater air velocity on the outside of bend 61.

To be able to position the blower nozzle 70 in at a perpendicular relative to the nozzle bores 111, it is equipped with a positioning device which also makes it possible to adjust the width of the outlet opening 16. FIG. 5 shows this adjusting mechanism by means of which the blown air L can be adjusted precisely to the applicable requirements. The blower nozzle 70 is radially fixed by means of the centering device 15 which is connected via the connecting rod 14 to the threaded segment 11. By rotating the threaded segment 11 on the threads 10 at the end of the blown air channel 8, the height of the centering device 15 is adjusted and is introduced into a centering recess 42 of the housing 4 (FIG. 1). The height of the upper part 7 of the blower nozzle 70 can now be adjusted so that the filaments 9 are cooled at the optimal moment after coming out of the nozzle bores 111.

The position of the lower part of the blower nozzle 70 can be changed through the threaded segment 11 and the compensating segment 12. By changing the position of the lower part 6 relative to the upper part 7, the outlet opening 16 can be adjusted in this manner so that the required cooling path up to the congealing of the filaments 9 is available for any titer, any material, and any production speed. Through a correct adjustment of the outlet opening 16 in combination with the conveyed mass of blown air L, it is possible to avoid an unnecessarily high consumption in air while nevertheless achieving the required cooling effect. Especially when finer fibers are spun, where a very large number of perforations are provided in the spinning nozzle package 1 for the sake of improved economy, the high air speeds necessary to overcome the resulting penetration resistance can be achieved by reducing the outlet opening 16 in this manner.

For an even cooling of the filaments 9 extruded from the nozzle bores 111, not only the described flow profile is necessary, but also that the flow profile be evenly present over the entire outlet opening of the blower nozzle. Even with the most precise adjustment of the gaps of the blower nozzle over the entire circumference, defects in the running reliability of the filament production may otherwise occur. FIG. 12 shows a blower nozzle head similar to the FIGS. 1, 3 and 4 which have already been described.

In FIG. 12 the blower nozzle 700 consists of an upper part 707 and a lower part 706. The lower part 706 is connected to a blown air channel 8 from which the blown air stream L enters the blower nozzle 700. The nozzle 700 can be a ring nozzle, for example, where the blown air stream L enters centrally from below and flows from the center of the blower nozzle 700 to the ring-shaped outlet opening 716, where it leaves the blower nozzle 700 and flows against the filaments 9 emerging from the bores 111 (not shown) of the spinning nozzle 1. In this way the blown air stream L first passes a deflection 720 which is followed by a narrowing 705 and which is in turn followed by a bend 710 before the blown air stream L reaches the outlet opening 716. The narrowing is produced by reducing the height h between the air guiding walls of the blower nozzle 700. The outlet opening 716 which follows the narrowing 705 has however again a greater height H than the narrowing 705. The blown air then emerges radially to the outside from the outlet opening 716 and flows the filaments 9 (not shown here) directly after their emergence from the nozzle bores, from the inside out. The outlet opening 716 of the blower nozzle 700 is ring-shaped in conformity with the circular arrangement of the nozzle bores and is concentric with the spinning nozzle package 1 (not shown here). As mentioned earlier, it has a cross-section with a greater height than the narrowing 705. The blown air channel 8 has a cross-section at the intake into the blower nozzle 700 that has again a greater height than the narrowing 705, so that this narrowing causes a deformation of the blown air stream L in such a manner that the latter is flattened out. It has been shown that this deformation makes it possible to achieve a considerable improvement in the distribution of flow velocity over the circumference of the outlet opening 716 of the blower nozzle 700. Turbulence in the arriving flow may possibly be reduced by this reduction and subsequent enlargement of the height, so that a homogenization of the flow velocity occurs across the entire area of the outlet opening 716. Furthermore, the bends 720 and 710 make it possible to achieve a more favorable velocity profile for the flow through the filament bundle, as already described earlier.

To be able to position the blower nozzle 700 relative to the nozzle bores 111 in vertical direction, it is equipped with an adjusting device such as described in connection with the embodiment according to FIG. 5. This adjusting device makes it possible to adjust the width of the outlet opening 716. The blower nozzle 700 is radially fixed in the same manner by means of a centering device 15 which is connected via a connecting rod 14 to the threaded segment 11. The connecting rod 14 is provided with threads 13 which engage the threaded bore 713 of the upper part. By means of these threads 713, the upper part 707 of the blower nozzle 700 can be adjusted in height so that the filaments 9 are cooled at the optimal moment upon emerging from the nozzle bores 111.

By adjusting the lower part 706 relative to the upper part 707, the outlet opening 716 can be adjusted so that the necessary cooling path is provided up to the congealing of the filaments 9 for any titer, any material, and any through- put. The correct adjustment of the outlet opening 716 in combination with the quantity of blown air L conveyed makes it possible to avoid unnecessarily high air consumption while nevertheless achieving the required cooling effect. Especially when spinning finer yarns, where a very large number of perforations are provided in the spinning nozzle package 1, a reduction of the outlet opening 716 can produce the high air velocities which are necessary to overcome the resulting penetration resistance.

The narrowing 705 also adapts automatically to this adjustment of the outlet opening 716 when the lower part 706 is adjusted relative to the upper part 707, so that the narrowing 705 always has a cross-section with a lower height h than the outlet opening 716, even when the latter is being reduced.

This narrowing 705 has proven to be extraordinarily effective. Tests have shown that the variation coefficient of the titer alone can be reduced by 20%. It was surprisingly possible to lower the quantity of blown air by approximately one half. This narrowing 705 has a considerable influence on the uniformity of the stream of blown air, not only in connection with the bend 710 preceding the outlet opening 716, but also takes effect with a conventional blower nozzle without the bend 710 according to the invention (e.g. DE-OS 2,920,676).

FIG. 13 shows another embodiment of the invention which is characterized by its considerably simple and less expensive manufacture. The blower nozzle 600 also consists of an upper part 607 and a lower part 606, whereby the blown air stream L enters the lower part 606 from the blown air channel 8. The upper part 607 and the lower part 606 are plate-shaped. The distance between upper and lower part creates a narrowing 605 which extends at a right angle to the blown air channel 8. This narrowing 605 is followed by an angular bend 620 through which a deflection of the stream of blown air takes place, so that the desired velocity profile is obtained at the outlet opening 616. When the upper part 607 is vertically displaced relative to the lower part 606, the height h of the cross-section of the narrowing 605 as well as the height H of the outlet opening 616 are narrowed at the same time, so that flow ratio is closely maintained.

As mentioned in the beginning, not only the timely and uniform cooling of the filaments 9 is important for the quality of the end product, but also a uniform temperature distribution in the molten mass P until before the emergence of said molten mass P from the nozzle bores 111. For this purpose an induction heating system is provided which is explained in further detail through FIGS. 6 and 7. In a recess 21 of the ring-shaped spinning nozzle package 1 a short circuit ring 2 is imbedded and has thus a direct connection to the spinning nozzle package 1 on three sides. The depth of the recess 21 in the spinning nozzle package 1 can coincide with the thickness of the short circuit ring 2, so that a flush fit can be achieved, but it is also possible to provide a cover ring for the short circuit ring 2 which is also seated in the recess 21 in the spinning nozzle package 1.

Figure 7:
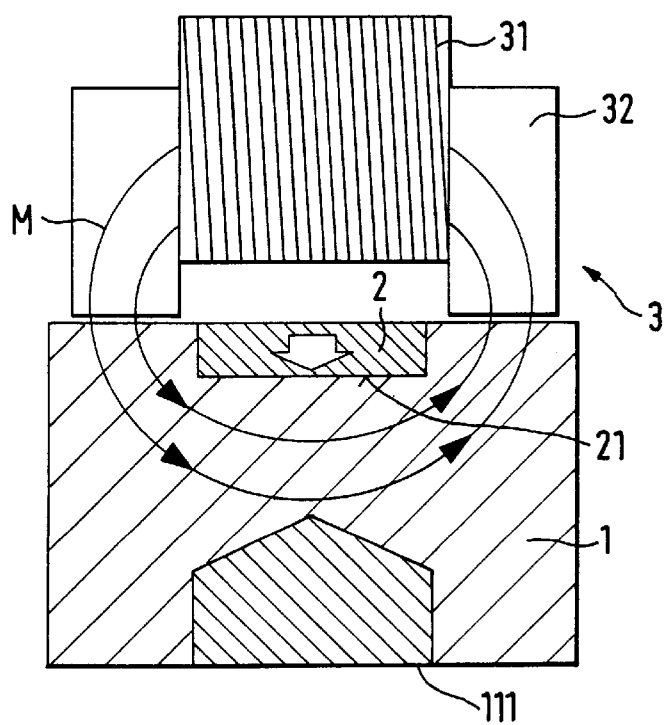

The induction coils 31 consist essentially of a horseshoe-shaped iron core 32 and of the winding 3. The recess 21 in the spinning nozzle package 1 produces two distinct poles which face the pole surfaces of the induction coils 3. With this arrangement the magnetic field lines M are bundled and oriented (FIG. 7). Furthermore, the induction coils 3 can thus be integrated effectively, easily and without expensive change in design of the spinning nozzle package 1.

When the induction coils 3 are now excited by alternating current, preferably within the range of the conventional network frequency of 50 or 60 Hz, a current is induced in the circumferential direction of the spinning nozzle package 1 in accordance with the ▒Generator Rule (right hand)▒. To allow this current to flow, as desired, in the circumferential direction, all the induction coils 3 must be in phase, i.e. the current in the coils must reach its minimum and maximum values at the same time, and flow through all the coils in the same direction.

The strength of the current induced in the spinning nozzle package 1 depends on the flow density in the magnetic circle and on the ohmic resistance of the material used (e.g. material No. 1,4057 with 0.7 $\Omega*mm^2/m$)

The strength of the current can be calculated according to the formula $p=I^2*R$.

Here the question is how much of the total capacity, consisting of the capacity of the short-circuit current and the capacity of all the eddy currents $P_w$ is made up by the short circuit share $P_k$.

The total capacity translated into heat is as follows:

$$P=U*I*\cos=P_w+P_k$$

$$P_k=P-P_w/P_w=P-P_k$$

If an even number of induction coils 3 are operated in opposite sense (the connections of every other coil are interchanged), the voltage produced in contrary sense drops, and no current is produced to flow over the entire circumference of the spinning nozzle package 1. Only eddy currents flowing in the vicinity of the pole surfaces of the induction coils 3 in the nozzle package material and only these eddy currents heat the spinning nozzle package 1 in this area.

However if many induction coils 3 in narrow division are distributed over the circumference of the spinning nozzle package 1, the zones of influence of the eddy currents overlap and a rather even distribution of temperature in the spinning nozzle package 1 is achieved, which may be sufficient for the spinning process. The temperature distribution is however even more even and the obtainable heat capacity (for a given size and at a network frequency of 50 or 60 Hz) is also greater and up to twice as great if all the induction coils 3 are in phase.

If a short circuit ring 2 made of a material with good electrical conductivity, e.g. copper, is inserted into the recess 21 in the spinning nozzle package 1 and is solidly connected to the material of the spinning nozzle package 1 so as to conduct heat well, the induced short-circuit current flows mainly in this short circuit ring which is heated evenly by the short-circuit current and transmits the heat thus produced to the spinning nozzle package 1. The heat in the short circuit ring is produced in even distribution over the entire circumference because the force of the current in the closed ring is equal in every cross-section and because this ring 2 has basically no changing cross-sections. The heat produced by the short-circuit current is thus transmitted very evenly to the nozzle package 1. Furthermore the heating capacity is increased.

During the spinning process, interferences from the outside, such as locally different cooling caused by the velocity of blown air which is never entirely even, act upon the nozzle bores 111 and thereby on the entire spinning nozzle package 1. Therefore an unchangingly even temperature distribution over the nozzle plate can only be achieved if the spinning nozzle package 1 is divided along its circumference into heating zones (sectors) the temperature of which can be regulated individually. Here the same desired temperature is predetermined as a rule for every sector.

According to the invention, the task of evenly heating a large annular, or rectangular, nozzle package 1, or one with a flat and different design, whereby locally appearing interfering influences can be compensated for, is accomplished as follows: Each induction coil 3 is assigned a temperature sensor on the surface of the nozzle package 1. By regulating according to the impulse-pause principle, the heat supply for each zone can be dosed via the induction coils 3. During the ON period of an induction coil 3, heat is generated in the spinning nozzle package 1 a) and is locally limited by eddy currents and b) is distributed evenly over the circumference of the upper part of the nozzle package from the share of the overall short-circuit current induced by this coil.

If the temperature of a heating zone constituted by the individual induction coils 3 deviates from the desired temperature, the ON time of the coil in question is increased or decreased, depending on whether the local temperature is lower or higher than the desired temperature.

During the OFF time of an induction coil 3, the heat capacity resulting from eddy currents in the area of this coil, and the contribution of this coil to the heat capacity of the short-circuit current, which is evenly distributed over the circumference of the spinning nozzle package 1, is missing.

During the ON time of an induction coil 3, heat and a share of the short-circuit current distributed over the entire circumference of the nozzle package is produced in the area of this coil by eddy currents.

Example: When 12 induction coils 3 are installed on the circumference of a spinning nozzle package 1 with a diameter of 920 mm and a mass of approx. 400 kg, and the total heat capacity is approximately 12 kW, it was found that the share of eddy current amounts to approximately 40% of the total capacity, i.e. 4.8 kW, or 0.4 kW per coil. The capacity of the short-circuit current amounts therefore to 7.2 kw, or 0.6 kW per coil. During the OFF time of a coil, the capacity of the heating zone in question is decreased by the eddy current capacity and the short-circuit capacity of this coil when all the other induction coils 3 are switched on:

$$0.4 \text{ kW}+1*0.6 \text{ kW}=(0.4+0.05) \text{ kW}=0.45 \text{ kW}$$

If several induction coils 3 are switched off at the same time, the eddy current effect is reduced as a function of the number of coils 3 switched off, while the short-circuit capacity decreases exponentially due to the gradually decreasing magnetic flux and with it the decreasing induction in the short circuit ring in the spinning nozzle package 1. By means of programmed controls, it is possible to adjust the temperature of a spinning nozzle package 1 as described earlier in the different heating zones so as to obtain precisely the desired value.

If an induction coil 3 of a group of e.g. 12 coils is switched off the supply net, an alternating voltage is produced in the switched-off coil by the alternating field which continues to be excited in the material of the spinning nozzle package 1 by the remaining 11 coils, their amplitude being shifted by 180° relative to the network voltage. The peak values of the network voltage and the voltage of the idling coil are additive. The switching element 35 which controls the coil must therefore sustain an admissible off-state voltage which is greater than the peak value of the network voltage plus the peak value of the voltage induced in the idling coil.

Example: Effective value of the network voltage: 220 V
Peak value 220 V*2=311 V.
Effective value in the voltage induced in the idling coil: 170 V
Peak value: 170 V*2=240 V
Total voltage via the semiconductor:

311 V+240 V=551 V.

Semiconductors, such as Triac or similar material, are preferably used here as switching elements.

The induction coils 3 consist essentially of the horseshoe-shaped iron core 32 and the winding 31.

Figure 6:
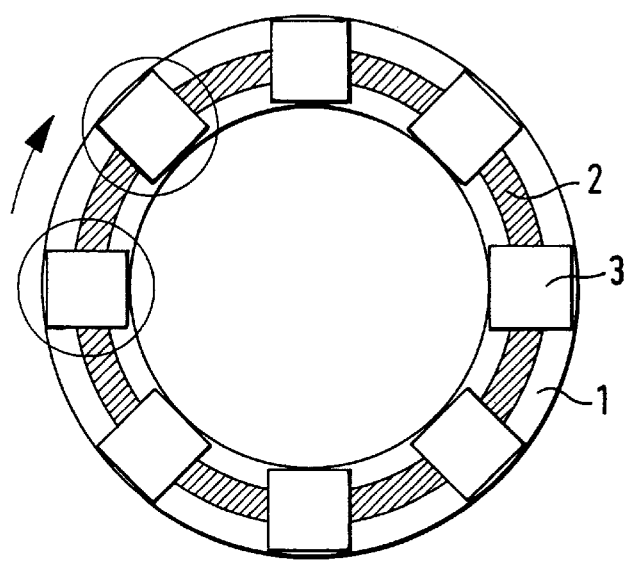
FIGS. 6 and 7 show the induction heating system schematically.

FIG. 6 shows a top view of the arrangement of the induction coils 3 distributed evenly over the circumference of the annular spinning nozzle package 1 which are designed fro the usual alternating voltage.

Figure 9:
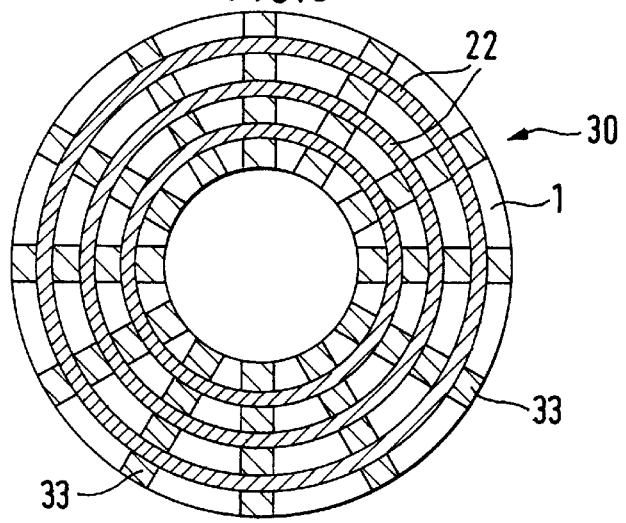
FIG. 9 shows another embodiment of the induction heating system.
Figure 10:
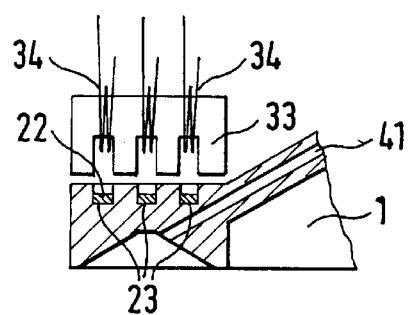
FIGS. 10/11 show details of the embodiment of FIG. 9.
Figure 11:
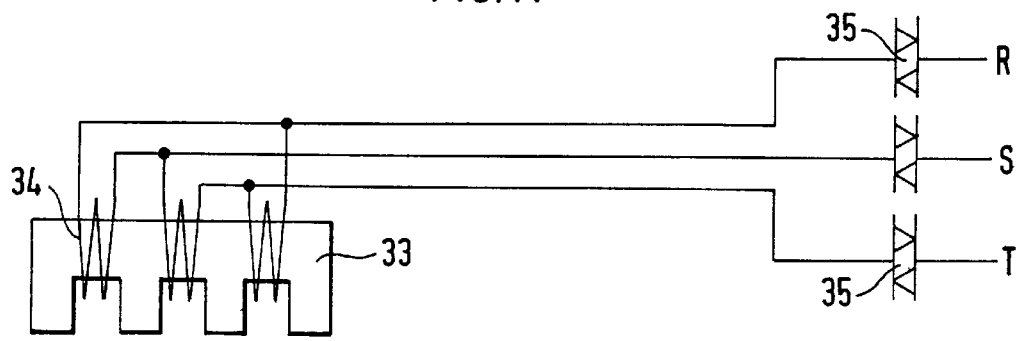

FIGS. 9, 10 and 11 show another embodiment suitable for three phase or rotary current. Three short circuit rings 22 are embedded next to each other in the recess 23 of the nozzle package 1. They are concentric, since the spinning nozzle package 1 is ring-shaped. In a straight-line spinning nozzle package 1 the three short circuit rings 22 are in a straight line and parallel with each other. Induction coils 3 are installed evenly above the three short circuit rings 22 over the circumference of the spinning nozzle package 1, each with three windings 34 on a horseshoe-shaped iron core 33 the pole shoes of which are located between the recesses 23 over the spinning nozzle package 1. Each winding 34 of the induction coil 30 is connected to the phase R or S or T via a dedicated switching element 35, so that each winding 34 can be switched on and off separately. In this manner, especially fine-tuned regulation of the heat capacity, in particular also in radial direction, is achieved.

It can easily be seen that the utilization of an induction heating system has advantages, first of all because the induction coils 3, 30 as heating elements are completely independent of the spinning nozzle package 1, so that when they are replaced, no connections need to be disassembled as is necessary in conventional electric or steam heating installations. On the other hand, heating is absolutely uniform, since different thermal bridge gaps etc. play no role as the heat is produced directly where it is needed. The induction heating system according to the invention has furthermore the advantage that the temperature can also be tuned very finely also within local limits.

The desired temperature is maintained by temperature sensors and the above-described switching device 35 by switching the individual induction coils 3, 30 or also individual windings 34 on and off. A particularly fine-tuned temperature regulation is achieved for example, in that the switching device 35 switches the induction coils 3, 30 on and off in a rapid timed rhythm. In this case each individual induction coil 3, 30 can be switched on and off individually. The system can however be designed also so that all the induction coils 3, 30 are switched on and of at the same time. The current setting of the switching frequency makes it possible to maintain a given temperature. By switching off individual induction coils 3, 30, less current is produced due to the excitement, so that less heat is produced in the short circuit ring 2 or 22, but this heat is distributed evenly over the entire ring. Thus, in case of a multi-zone temperature regulation, the possibility exists to even out temperature differences on the circumference of a spinning nozzle package 1 caused by the external interference magnitudes by switching individual induction coils 3, 30 off and on, whereby this is done by the above-mentioned switching device 35 at clocking intervals of a few fractions of a second.

Figure 8:
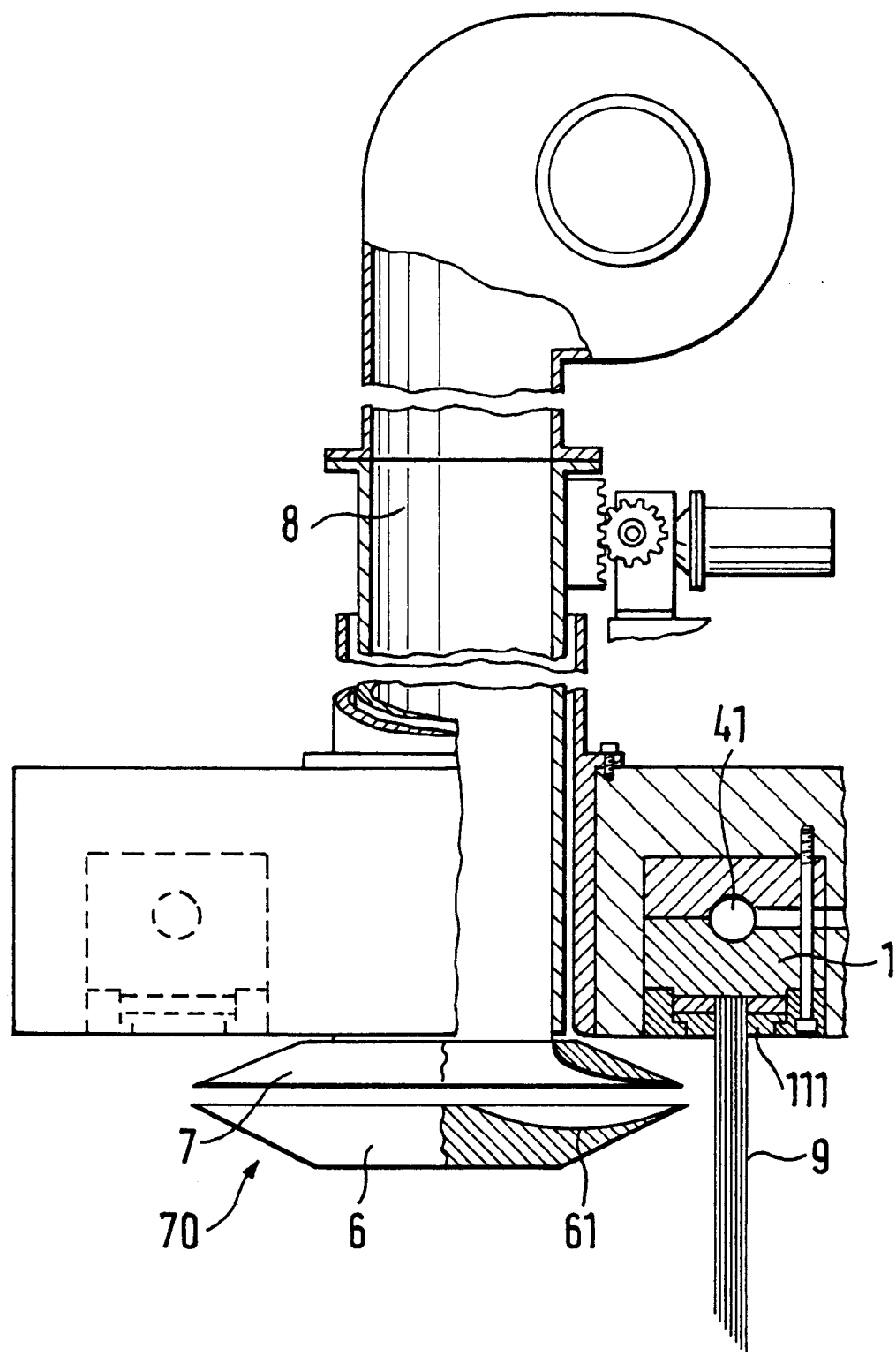
FIG. 8 shows the apparatus according to the invention, with blown air fed from above.

The invention has been described through examples where the air arrives from below. The invention can however be applied with equal advantage with air supply coming from above, as shown in FIG. 8. In this case it is not necessary to provide a second bend 71 upstream, since the air stream already comes from above and the desired flow profile is produced by the bend 61.

In the embodiment of FIG. 13 the air arrives from below. In this embodiment the air can also come from above. In this case, the lower part 610 is a closed plate. The blown air channel 8 is connected to the upper part 607.

The invention is also not limited to an annular spinning nozzle package 1 or on a blower nozzle 70, 600 or 700 with an annular outlet opening 16, 616 or 716. With an arrangement in a row it is also easily possible to produce a corresponding flow profile, or to provide for a corresponding narrowing 605, 705 so that nozzle plates with large surfaces can be used. It is easily possible for the cross-sections shown in FIGS. 1 or 12 and 13 to refer to two nozzle packages 1 in a row which are symmetrically placed relative to the blower nozzle 70 or 600 or 700 and are provided with two slit-shaped outlet openings 16 or 616 or 716 associated with the nozzle bore rows 111. Here too, it is possible to install an induction heating system in which the induction coils 3 or 30 are then of course placed in a row above the area over which the spinning nozzle package 1 extends. The short circuit ring 2 or 22 is in this case not made in form of a ring but is lined up in row with the nozzle bores 111. The action is otherwise the same as indicated above for the ring-shaped arrangement.

The linear arrangement has the advantage that when air is supplied from below, no division as with a sword, or otherwise, through the blown air supply is necessary. The blown air L can be supplied between the filament bundles 9 emerging from the nozzle bores 111. Similarly, a supply of the blown air stream L from above as well as from below is possible, as has been described earlier for the ring-shaped arrangement according to FIG. 8.

It should be apparent to those skilled in the art that various modifications and variations can be made in the present invention without departing from the scope and spirit of the invention. It is intended that the present invention cover such modifications and variations as come within the scope of the appended claims and their equivalents.

What is claimed is:

1. A device for extruding yarns from a molten polymer material, comprising:

distribution channels through which molten polymer material is fed;

spinning nozzles in communication with said distribution channels for receipt of said molten polymer material;

a cooling system having a blowing nozzle disposed to deliver cooling air to said spinning nozzles to cool said yarns extruded from said molten polymer material through said spinning nozzles, said blowing nozzle disposed generally at a center of an area defined by said spinning nozzles and configured to distribute said cooling air outward from said center towards said spinning nozzles, said cooling system also comprising a channel in communication with said blowing nozzle to deliver cooling air to said blowing nozzle in an essentially vertical direction;

said blowing nozzle comprising an upper plate member and a lower plate member spaced apart from said upper plate member and facing said spinning nozzles, said plate members defining a guide therebetween wherein said cooling air moves from an initial vertical direction in said channel, into said guide, and is redirected to a generally horizontal direction by said guide, said plate members defining an outlet opening wherein said cooling air exits said guide and is directed to said spinning nozzles; and a first bend defined in said lower plate member of said guide upstream of said outlet opening and downstream from where said cooling air changes direction from said initial vertical direction to said generally horizontal direction in said guide, said first bend defining a crest on a side away from said spinning nozzles and having a shape such that said cooling air is compacted and deflected thereby thus generating a velocity profile for said cooling air exiting said outlet opening wherein said cooling air emerging adjacent said lower plate member at said outlet opening is at a greater velocity than said cooling air emerging adjacent said upper plate member.

2. The device as in claim 1, wherein said cooling air is directed in an initially upward vertical direction in said channel.

3. The device as in claim 2, further comprising a second bend defined in said guide by said upper plate member configured to deflect and turn said cooling air emerging from said channel to a generally opposite vertical direction.

4. The device as in claim 1, wherein said guide comprises a segment between said first bend and said outlet opening, said segment having a length of generally between two to four times a cross-sectional height of said outlet opening.

5. The device as in claim 1, wherein said guide preceding said first bend in a direction of travel of said cooling air has a cross-sectional height less than that of said outlet opening.

6. The device as in claim 3, wherein said second bend is disposed above an essentially parallel plane through said outlet opening, said guide between said first bend and said second bend having a cross-sectional height less than that of said outlet opening.

7. The device as in claim 1, wherein said upper and lower plate members are adjustable relative to each other, said outlet opening thereby having an adjustable cross-sectional height.

8. The device as in claim 1, wherein said spinning nozzles are disposed in a generally circular pattern, said blower nozzle disposed within said circular pattern, said outlet opening having a circular configuration so that said cooling air flows radially outward against yarns emerging from said spinning nozzles.

9. The device as in claim 1, wherein said spinning nozzles are disposed in at least two rows with said blower nozzle disposed therebetween, said blower nozzle defining an outlet opening assigned to each of said rows of spinning nozzles.

10. A device for extruding yarns from a molten polymer material, comprising:

distribution channels through which molten polymer material is fed;

spinning nozzles in communication with said distribution channels for receipt of said molten polymer material;

a cooling system having a blowing nozzle disposed to deliver cooling air to said spinning nozzles to cool said yarns extruded from said molten polymer material through said spinning nozzles, said blowing nozzle concentric within said spinning nozzles and configured to distribute said cooling air radially outward towards said spinning nozzles, said cooling system also comprising a channel in communication with said blowing nozzle to deliver cooling air to said blowing nozzle in an essentially vertical direction;

said blowing nozzle comprising an upper plate member and a lower plate member spaced apart from said upper plate member and facing said spinning nozzles, said plate members defining a guide therebetween wherein said cooling air moves from said channel and into said guide, said plate members also defining an outlet opening wherein said cooling air exits said guide and is directed to said spinning nozzles;

a second bend defined in said guide by said upper plate member and disposed so as to deflect and turn said cooling air emerging from said channel from its vertical direction to a generally opposite vertical direction; and a first bend defined in said guide by said lower plate member upstream of said outlet opening and downstream of said second bend, said first bend defining a crest on a side away from said spinning nozzles and having a shape so as to deflect said cooling air emerging from said second bend to a radially outward direction and to compact said cooling air before it exits said outlet opening thereby producing a velocity profile for said cooling air wherein said cooling air emerging adjacent said lower plate member at said outlet opening is at a greater velocity than said cooling air emerging adjacent said upper plate member.

11. The device as in claim 10, wherein said second bend is disposed above an essentially parallel plane through said exit opening.

12. The device as in claim 10, wherein said first bend defines an angle of generally less than 90 degrees.

13. The device as in claim 10, wherein said guide comprises a segment between said first bend and said exit opening, said segment having a length of generally between two to four times a cross-sectional height of said exit opening.

14. The device as in claim 10, wherein said guide preceding said first bend in a direction of cooling air travel has a cross-sectional height less than that of said exit opening.

15. The device as in claim 10, wherein said second bend is disposed above an essentially parallel plane through said exit opening, said guide between said first bend and said second bend having a cross-sectional height less than that of said exit opening.

16. The device as in claim 10, wherein said exit opening has an adjustable cross-sectional height.

17. The device as in claim 16, wherein said upper and lower plate members are adjustable relative to each other thereby providing for said adjustable cross-sectional height of said exit opening.

18. The device as in claim 10, wherein said exit opening comprises a flow angle of generally between 10 and 30 degrees relative to a horizontal plane through said blowing nozzle.

19. The device as in claim 10, wherein said spinning nozzles are disposed in a generally circular pattern, said blower nozzle disposed within said circular pattern with a circular said outlet opening so that said cooling air flows from the inside radially outward against the yarns emerging from said nozzles.

20. The device as in claim 10, wherein sail spinning nozzles are disposed in at least two rows with said blower nozzle disposed therebetween, said blower nozzle defining an outlet opening assigned to each of said rows of spinning nozzles.

21. A blower nozzle for use in a device for extruding yarns from a molten polymer material wherein cooling air is directed through said blower nozzle towards spinning nozzles used to extrude said polymer material, said blower nozzle comprising an upper plate member and a lower plate member spaced apart from said upper plate member and facing said spinning nozzles, said plate members defining a guide therebetween wherein said cooling air moves from said channel and into said guide, said plate members also defining an outlet opening wherein said cooling air exits said guide and is directed to said spinning nozzles, said guide having a segment preceding said outlet opening with a cross-sectional height less than that of said outlet opening; and a first bend defined in said guide by said lower plate member upstream of said outlet opening, said bend having a shape so as to compact and deflect said cooling air before it exits said outlet opening thereby producing a velocity profile for said cooling air wherein air emerging at said outlet opening adjacent said lower plate is at a greater velocity than air emerging adjacent said upper plate.

22. The blower nozzle as in claim 21, wherein said first bend defines a crest on a side away from said spinning nozzles.

* * * * *